United States Patent [19]
Morsell

[11] 4,065,670
[45] Dec. 27, 1977

[54] SPHERICAL ELECTRODE X-RAY IMAGING CHAMBER

[75] Inventor: Arthur Lee Morsell, Van Nuys, Calif.

[73] Assignee: Xonics, Inc., Van Nuys, Calif.

[21] Appl. No.: 729,946

[22] Filed: Oct. 6, 1976

[51] Int. Cl.[2] .......... G03B 41/16
[52] U.S. Cl. .......... 250/315 A
[58] Field of Search .......... 250/315 R, 315 A

[56] References Cited

U.S. PATENT DOCUMENTS

| | | | |
|---|---|---|---|
| 3,828,192 | 8/1974 | Morsell | 250/315 A |
| 3,836,777 | 9/1974 | Lewis | 250/315 A |
| 3,975,626 | 8/1976 | Van England | 250/315 A |

*Primary Examiner*—Craig E. Church
*Attorney, Agent, or Firm*—Harris, Kern, Wallen & Tinsley

[57] ABSTRACT

An imaging chamber for a radiographic system for exposing an image receptor sheet to an X-ray source. A chamber with an X-ray window having low and uniform X-ray absorption and being substantially rigid for maintaining a uniform gap spacing between the electrodes with a high pressure in the gap. A window comprising inner and outer plates joined at the sides and a space between the sides with a compression resistant filler, with one plate stressed in compression and the other stressed in tension. A chamber using the X-ray absorbing gas to press the receptor sheet against an electrode to achieve the desired sheet configuration.

14 Claims, 5 Drawing Figures

SPHERICAL ELECTRODE X-RAY IMAGING CHAMBER

BACKGROUND OF THE INVENTION

This invention relates to X-ray systems of the ionographic or electron radiographic type and, in particular, to a new and improved cassette or receptor holder, usually referred to as an imaging chamber. In electron radiography, a dielectric sheet or receptor is utilized as the record medium in place of the more conventional photographic film. The dielectric receptor sheet is positioned in the imaging chamber between spaced electrodes, with a gas at high pressure in the gap between the electrodes. The variation in X-ray intensity exiting from the object illuminated by the X-ray source produces a variation in electron density on the dielectric sheet. This electrostatic image on the dielectric sheet is then converted to a visual image using conventional techniques, such as the xerographic process. For further information on the ionographic system reference may be made to U.S. Pat. Nos. 3,774,029 and 3,963,924.

A problem in the design of an electron radiography imaging chamber is containing the gas at high pressure while transmitting X-rays through a large and relatively flat window of the chamber. The X-ray absorption through the window should not only be small, but also should be uniform across the window in order to prevent an X-ray image of the nonuniformities of the window. Generally the inner surface of the X-ray window can be flat or gently curved in one direction or dished in a spherical shape. Preferably, the radii of curvature should be about the same as the distance to the X-ray source. It has been found that in order to keep the X-ray absorption of the window within reasonable bounds, the radiation should pass through no more material than the equivalent of one-half inch of solid beryllium. At the same time, the bulge of the window when subjected to the gas pressure must be kept small. Further, the edge supports for the window must be compatible with a chamber design providing for insertion and removal of the electrostatic image receptor sheet.

Typical picture sizes for medical X-rays are 8 × 10 inches and 14 × 17 inches, and a simple half-inch thick plate is not strong enough for use as a window at the operating pressure of the chamber, which typically is 10 atmospheres.

It is usually desired that the electrode surfaces at the gap in the imaging chamber have a spherical configuration with the X-ray source as the center. The reasons for this construction are well recognized and a number of imaging chamber configurations have been proposed for achieving this end. U.S. Pat. No. 3,828,192 shows a structure with spherical electrodes with the receptor sheet stretched against the convex surface of one of the electrodes. U.S. Pat. No. 3,963,924 shows an imaging chamber where one or both of the electrodes comprises a conducting layer on the dielectric receptor sheet, with the radiation absorbing gas on one side of the sheet and another gas on the other side of the sheet, with the differential pressure of the gases producing a spherical shape for the sheet. U.S. Pat. Nos. 3,859,529 and 3,883,740 show another approach wherein complex electrode structures are utilized to produce a spherical electric field in a planar gas gap.

These prior art structures suffer from various disadvantages including unsatisfactory radiation window design, requirement for complex electrode structure, and requirement for balancing of two gas supplies with an unsupported receptor sheet. Accordingly, it is an object of the present invention to provide a new and improved imaging chamber with X-ray window which will have the desired radiation transmission characteristics while being structurally secure and readily operable at elevated gas pressures. A further object is to provide a new and improved mechanism for closing and opening the imaging chamber and for positioning the receptor sheet therein. A particular object is to provide a new and improved method and apparatus for conforming the flexible receptor sheet to the previously determined configuration of a rigid electrode. Other objects, advantages, features and results will more fully appear in the course of the following description.

SUMMARY OF THE INVENTION

The present invention is directed to a new and improved imaging chamber for radiography and to a new and improved composite window construction for an imaging chamber. The window is formed of first and second relatively thin plates joined at opposite sides and spaced from each other between the sides by a compression resistant filler, with one plate being stressed in compression and the other stressed in tension providing a balanced loading for the window mounting.

The chamber is particularly suitable for mammography providing a structure which can be positioned just below the breast, against the chest wall of the patient with just a small distance between the patient's chest and the edge of the image, so as to include as much of the breast as possible in the image. The chamber includes a mechanism for moving one electrode relative to the other for closing and opening the chamber and for introducing and removing the receptor sheet. The invention further includes method and apparatus for forming the flexible receptor sheet to the configuration of one of the electrode surfaces after the chamber is closed, by utilizing the radiation absorbing and ion producing gas to force the receptor sheet against the selected electrode.

DESCRIPTION OF THE PREFERRED EMBODIMENT

Figure 1:
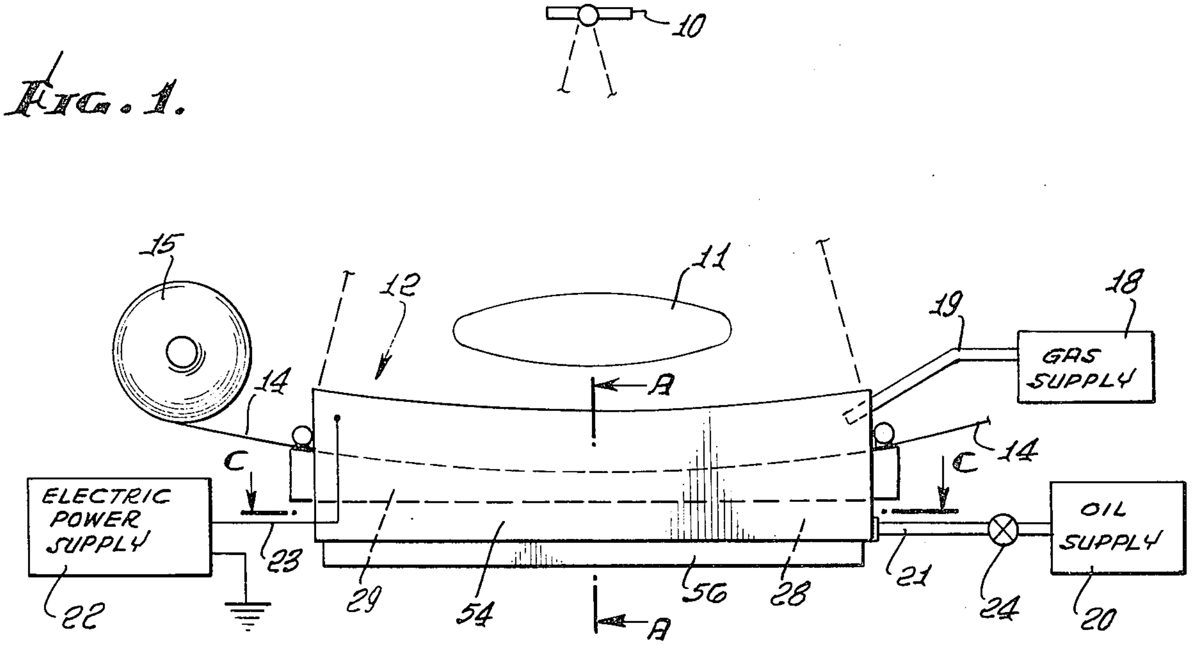
FIG. 1 is a diagrammatic view of an electron radiographic system incorporating the presently preferred embodiment of the imaging chamber.

In the system illustrated in FIG. 1, radiation is directed from an X-ray source 10 through an object 11 to an imaging chamber 12. The imaging chamber is shown in greater detail in FIGS. 2–5. The electrostatic image receptor sheet 14 is fed into the chamber singly or from a roll 15 as desired. The receptor sheet may be inserted and removed from the same end of the chamber, or inserted at one end and removed from the opposite end. A gas supply 18 is connected to the imaging chamber through a line 19, an oil supply 20 is connected to the chamber through a line 21, and an electric power supply 22 is connected to one of the electrodes through a cable 23 and to circuit ground as indicated.

The imaging chamber includes a base 28 with an electrode 29 carried thereon. In the preferred embodiment illustrated, the electrode 29 is moved up and down with respect to the base for the purpose of closing and opening the chamber. In the electrode moving mechanism illustrated, a guide pin 32 is affixed to the electrode 29 by a screw 33, with the guide pin sliding in a bushing 34 mounted in the base 28.

The electrode 29 is moved upward by a plurality of piston and cylinder combinations, each comprising a piston 37 pushing on the electrode 29 and riding in a cylinder 38 in the base 28. A seal ring 39 is provided on the piston. Oil under pressure is delivered to each cylinder from the oil supply 20 via line 21 and passages 41, 42 in the base 28.

Two pull down spring mechanisms are provided. A spring 44 is positioned around a screw 45 in an opening 46 in the base 28, with the screw engaging the electrode 29. When oil under pressure is introduced into the cylinders, the electrode is moved upward compressing the springs 44. When the oil is exhausted from the cylinders, the springs move the electrode down. The electrode 29 is shown in the up or chamber closed position in FIG. 3 and in the down or chamber open position in FIG. 4.

An X-ray window at the top of the imaging chamber is formed of an upper plate 50 and a lower plate 51, with a core 52 positioned between the plates. The upper plate 50 preferably has sides 54 extending downward around the electrode 29 and base 28, with flanges 55 clamped to the base by bars 56 and screws 57.

The lower plate 51 is joined to the upper plate 50 by end members 60 and the two plates are cemented together at the sides. A peripheral seal 61 is carried on the lower edge of a frame 62 in turn carried on the lower plate 51. The frame 62 is cemented to the lower plate 51 and to the insulating layer 65.

The plates 50, 51 are relatively rigid and should be made of a material having low and uniform X-ray absorption. In the preferred embodiment, the plates are molded of an epoxy-graphite. This composition is a good electrical conductor and permits the lower plate 51 to serve as an electrode of the imaging chamber. An insulating layer 65 is bonded to the inner surface of plate 50 to insulate the plate 51 from the remainder of the imaging chamber. The core 52 preferably is a material having substantially zero X-ray absorption as well as high resistance to compression. Because high shear strength is not required for the core material, balsa wood and rigid acrylic foam are suitable materials.

The members 60 which join the upper and lower plates 50, 51 at each end of the window preferably are an insulating epoxy molded in place with the plates clamped in the desired configuration. A gas manifold 67 may be molded in one of the members 60, with the manifold 67 connected to the gas supply line 19 and providing gas flow paths through the lower plate 51 and the frame 62 to the gap between the electrode 29 and plate 51 above the sheet 14. Gas may be exhausted through the manifold 67 or through a similar manifold at the opposite end of the window. A passage 68 in the electrode 29 provides a path for flow of air trapped between the sheet 14 and electrode 29. Guide rolls or springs 70 may be carried on brackets at each end of the electrode 29 for guiding the receptor sheet 14 during insertion and removal.

Figure 3:
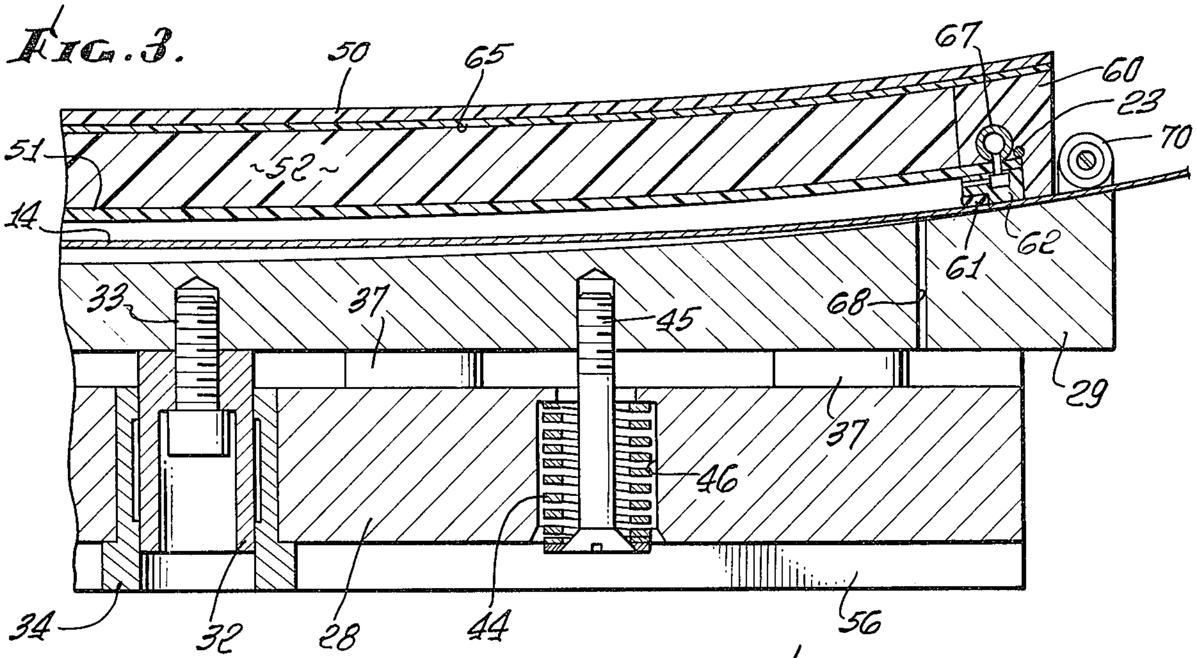
FIG. 3 is an enlarged partial sectional view taken along the line 3—3 of FIG. 2, showing the chamber in the closed position.
Figure 4:
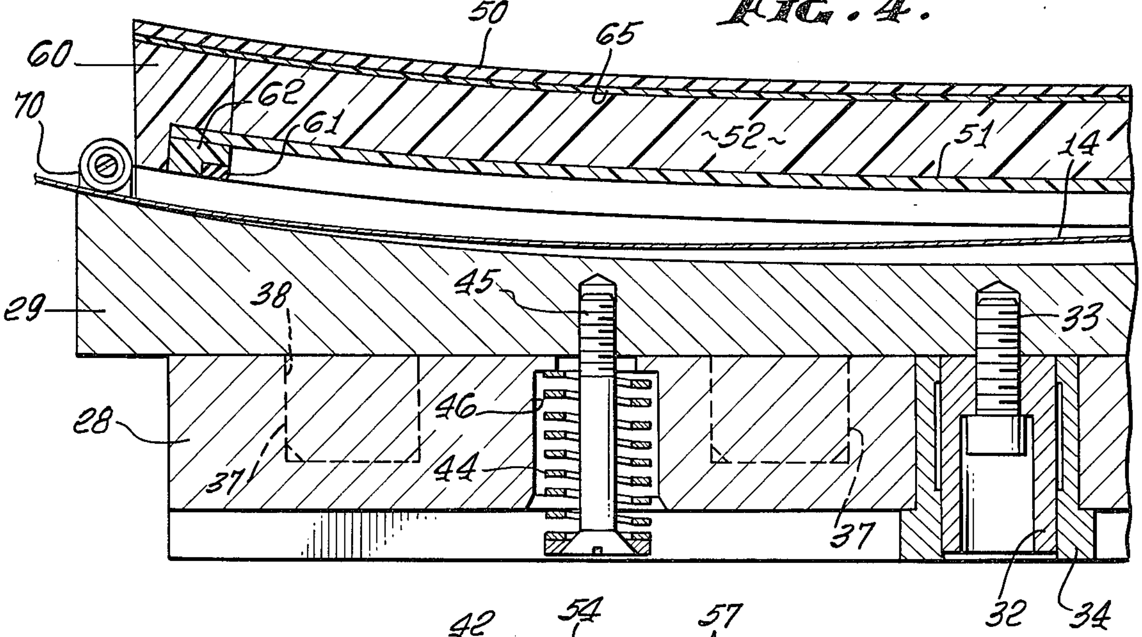
FIG. 4 is a view similar to that of FIG. 3 showing the chamber in the open position.
Figure 5:
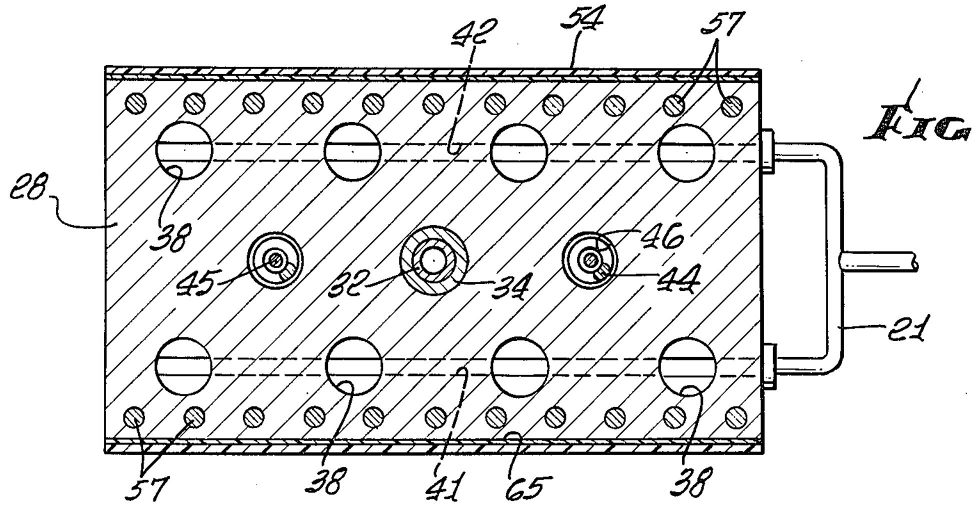
FIG. 5 is an enlarged sectional view taken along the line C—C of FIG. 1.

In operation, the oil supply is off and the electrode 29 is in the down position of FIG. 4, with the imaging chamber open. A receptor sheet 14 is inserted into the chamber in the gap between the electrode 29 and the plate 51 which serves as the other electrode. The oil supply is turned on and the lower electrode 29 is moved upward to the chamber closed position of FIG. 3, with the receptor sheet 14 clamped between the seal 61 and the electrode 29, generally in the position shown in FIGS. 2 and 3. The gas supply is turned on, introducing gas through the line 19 and manifold 67 into the gap above the receptor sheet 14. The gas functions to absorb radiation and produce ions and is maintained in the gap at a high pressure, typically 10 atmospheres. Introduction of the gas into the gap forces the receptor sheet 14 downward into intimate contact with the electrode 29 so that the receptor sheet has the configuration of the upper surface of the electrode. The electric power supply 22 is turned on, providing an appropriate electric field in the gap between the plate 51 and electrode 29. The X-ray exposure is then made after which the electric power supply is turned off, the gas is removed from the gap and the oil supply is turned off, permitting the chamber to open for removal of the receptor sheet which now carries the electrostatic image. This electrostatic image is developed into a visual image in the normal manner.

A relatively low pressure, typically 300 to 400 psi, is used to close the imaging chamber, after which the valve 24 is closed, locking the chamber shut. When the gas gap is pressurized, the force of that gas pressure over the large area of the receptor sheet causes the oil pressure under the pistons to increase substantially, typically to 1800 psi, but this pressure increase is blocked from the supply 20 by the valve 24.

Figure 2:
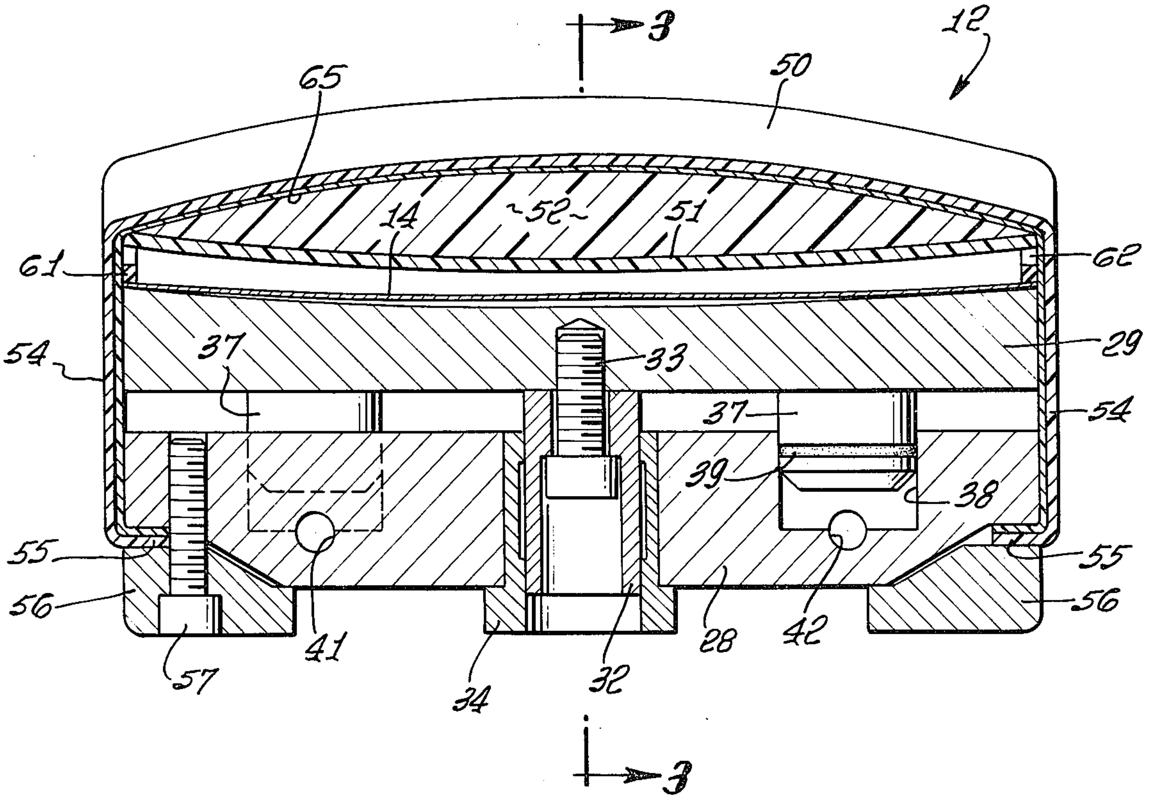
FIG. 2 is an enlarged sectional view taken along the line A—A of FIG. 1.

The window construction of the invention provides the required low and uniform X-ray absorption together with the strength to withstand the gas pressure without deformation. In the preferred embodiment illustrated, the lower plate 51 is spherical, being convex when viewed from the gap in FIGS. 2 and 3, while the upper plate 50 is saddle shaped being, when viewed from the outside, convex as seen in FIG. 2 and concave as seen in FIG. 3. This configuration is not essential, as either plate could be straight as viewed in FIG. 2. In the embodiment illustrated, the plate 50 supports 81% and the plate 51 supports 19% of the pressure in the gas gap. The pressure force is transmitted between the plates by the low density core 52 which withstands a compressive stress equal to 81% of the gas gap pressure. The lower plate 51 is stressed in compression and the upper plate 50 is stressed in tension. With this configuration, the horizontal components of the required edge forces at the sides for the two plates are equal and opposite. Thus when the plates meet at the sides, the horizontal components of the constraint forces are eliminated and it is not necessary for the sides of the upper plate or the base to supply or withstand horizontal forces.

As indicated above, the window curvature as shown in FIG. 3 is not essential but is preferred in that it permits a spherical gas gap which maximizes image resolution. Further, it is not essential that the plates 50, 51 have identical radii of curvature. If one plate is flat and the other has twice the curvature of the preferred embodiment illustrated, the stresses in the plate and the central thickness of the window structure will remain substantially the same, provided that the sides allow a small amount of sideways motion, such as a few thousandths of an inch. For plates with equal radii of curvature there is no sideways motion. The compression stress in the filler between the plates will vary between zero for the configuration with the upper plate 50 flat and the lower plate 51 curved, and a value equal to that of the gas pressure for a configuration with a lower plate 51 flat and the upper plate 50 curved.

The receptor sheet is clamped around the periphery of the gap when the chamber is closed. When the radiation absorbing gas is introduced into the gap, the sheet is stretched slightly to the configuration of the lower electrode, however, when the gas pressure is removed, the sheet will return to the prepressurized position. When the sheet is removed from the chamber it readily returns to a flat shape. The engagement of the lower electrode with the seal provides sufficient edge clamping forces on the sheet to keep the edges of the sheet from rippling or slipping inward.

In designing the imaging chamber, the lower electrode 29 can be made of a thick block of metal such as aluminum and will suffer no deformation when the chamber is pressurized. The plates 50, 51 of the window will be made substantially thinner and ordinarily will deform somewhat under the gas pressure. This can readily be taken care of in the design of the components. For example when operating with the X-ray source 40 inches from the gap, the gap surface of the electrode 29 preferably is made spherical with a 40 inch radius. The lower plate 51 which forms the upper electrode of the gap will be manufactured with a 40 inch radius in the plane of FIGS. 3 and 4 and a 28 inch radius in the plane of FIG. 2. However when the gap is pressurized, the window will be compressed slightly producing flattening of the plate 51 to a radius of about 40 inches so that the gap width is uniform through the chamber.

I claim:

1. In an imaging chamber for a radiographic system, the combination of:

a base;

a first electrode carried in said base;

an X-ray window comprising an outer plate and an inner plate with a conductive surface serving as a second electrode, with said plates in engagement at opposite sides thereof and spaced from each other between said sides by a compression resistant filler;

means for mounting said plates to said base with said inner plate adjacent said first electrode defining a gap therebetween; and means for sealing said gap adjacent the periphery of said inner plate to maintain a fluid in said gap.

2. An imaging chamber as defined in claim 1 wherein said outer plate is saddle shaped and said inner plate is convex as viewed from the gap.

3. An imaging chamber as defined in claim 2 wherein said inner plate is generally spherical.

4. An imaging chamber as defined in claim 1 including means for mounting said first electrode in said base for movement toward and away from said window, with said means for sealing mounted on said window and engaging said first electrode when said electrode is moved toward said window.

5. An imaging chamber as defined in claim 4 including guide means on said first electrode at least one end of said window for feeding an image receptor sheet through said gap.

6. An imaging chamber as defined in claim 4 wherein said means for mounting includes a plurality of fluid cylinders and pistons connected between said base and first electrode and means for introducing fluid under pressure to said cylinders to move said electrode.

7. An imaging chamber as defined in claim 1 including:

means for electrically insulating said first electrode from said inner plate;

means for connecting an electrical potential across said first electrode and inner plate with said inner plate serving as the second electrode;

and means for introducing a gas under pressure into said gap.

8. An imaging chamber as defined in claim 1 wherein said outer plate has a top and opposed depending sides positioned on opposite sides of said first electrode and fixed to said base, and including means carried in said base for moving said first electrode toward and away from said inner plate.

9. An imaging chamber as defined in claim 8 wherein said outer plate includes inwardly turned flanges on said depending sides, and including means for clamping said flanges to said base.

10. An imaging chamber as defined in claim 1 including means joining said outer and inner plates at the opposite ends thereof.

11. An imaging chamber as defined in claim 1 including means for clamping an electrostatic image receptor sheet in the gap, and means for introducing an X-ray absorbing and ion producing gas under pressure into said gap on one side of said sheet, with the gas forcing said sheet against one of said inner plate and first electrode.

12. An imaging chamber as defined in claim 11 wherein said first electrode is concave as viewed from said gap, and said gas is introduced between said sheet and inner plate forcing said sheet against said first electrode.

13. A method of obtaining a shaped electrostatic image receptor sheet in an imaging chamber for making radiographs using a source of ionizing radiation directed to a gap between electrodes of the imaging chamber, where one of the electrodes is concave, including the steps of:

clamping the receptor sheet about its periphery in the gap between the electrodes at the concave electrode; and introducing a radiation absorbing and ion producing gas under pressure into the gap on one side of the radiation sheet stretching the sheet into a concave shape with the concave electrode serving as a mold defining the shape of the sketched sheet, and with the gas holding the sheet in place against the electrode.

14. The method as defined in claim 13 wherein the source of radiation is substantially a point source and the surfaces of the electrodes at the gap are substantially spherical with the radiation source as center, and the receptor sheet is forced into a substantially spherical configuration by the radiation absorbing and ion producing gas.

* * * * *